United States Patent [19]

Mori

[11] 4,184,710
[45] Jan. 22, 1980

[54] CARRIER SHOE FOR A VEHICLE'S SLIDABLE ROOF

[75] Inventor: Keizi Mori, Toyota, Japan

[73] Assignee: Aisin Seiki Kabushiki Kaisha, Kariya, Japan

[21] Appl. No.: 955,215

[22] Filed: Oct. 27, 1978

[30] Foreign Application Priority Data

Oct. 29, 1977 [JP] Japan ............................ 52-145269[U]

[51] Int. Cl.² .............................................. B60J 7/04
[52] U.S. Cl. .................................................. 296/137 E
[58] Field of Search ...................... 296/137 E, 137 F; 160/209; 49/218

[56] References Cited

U.S. PATENT DOCUMENTS

| 2,968,514 | 1/1961 | Golde | 296/137 F |
| 3,290,087 | 12/1966 | Werner | 296/137 E |
| 3,737,194 | 6/1973 | Lutz et al. | 296/137 E |
| 3,863,979 | 2/1975 | Bienert | 296/137 E |

*Primary Examiner*—David M. Mitchell
*Attorney, Agent, or Firm*—Finnegan, Henderson, Farabow & Garrett

[57] ABSTRACT

Carrier shoe for a vehicle's slidable roof includes shoe slidable along a rail for opening and closing a roof. The shoe has a rotatable member received therein into which a link member is screwed. The link member is connected by a pivot to the slidable roof. Thus, the rotation of the rotatable member permits the link member to move in a vertical direction thereby adjusting the position of the slidable roof relative to the vehicle's roof.

3 Claims, 3 Drawing Figures

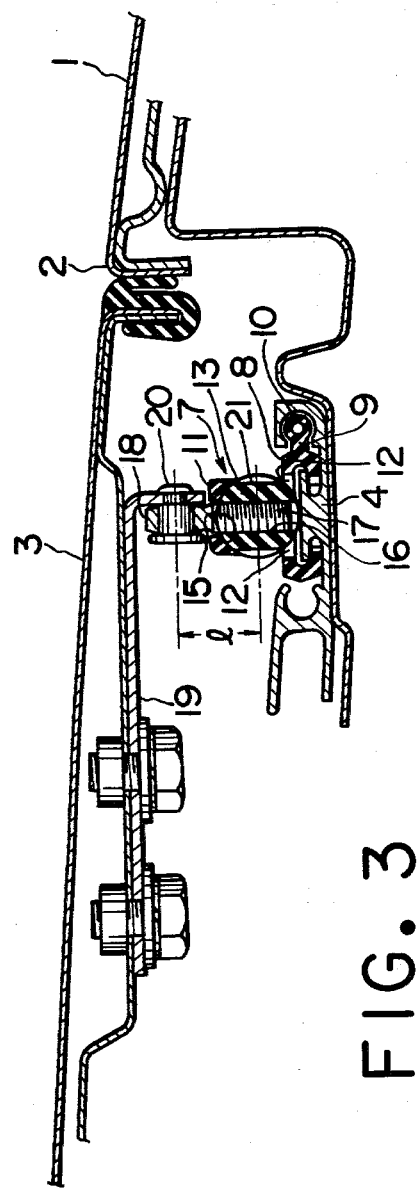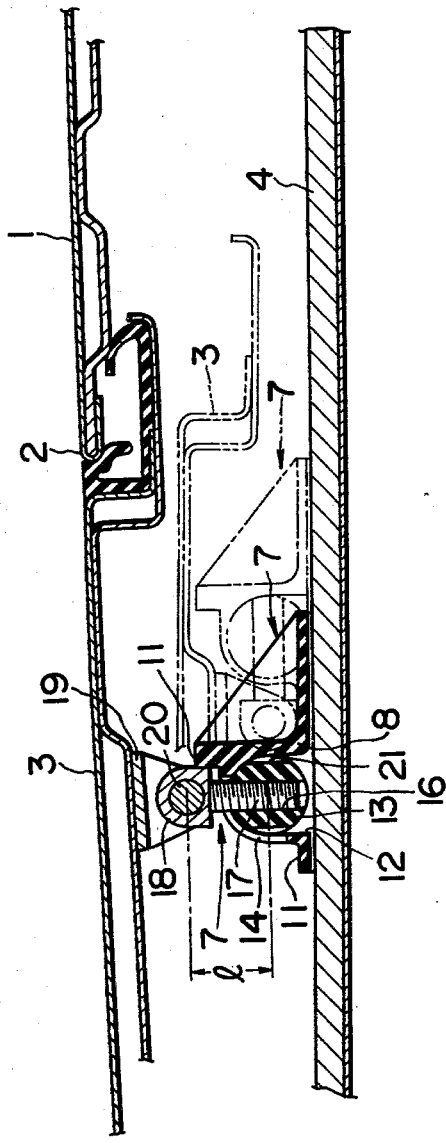

CARRIER SHOE FOR A VEHICLE'S SLIDABLE ROOF

The present invention relates to carrier shoe means for a vehicle's slidable roof, and more particularly to carrier shoe means for a vehicle's slidable roof which have the function of adjusting the vertical position of the slidable roof in respect of the plane of the stationary part of the vehicle's roof.

In general, a vehicle having an opening in the roof panel thereof, is provided with a slidable roof in such a way that the same is seated in and closes the opening and can be lowered and then displaced to slide rearwardly under the stationary part of the roof panel when it is opened.

Such a slidable roof is provided with carrier shoes which engage logitudinally extending rails disposed on the inside of the vehicle's roof at the opposite sides of the opening and are guided thereby. It is required in this arrangement that the outer surface of the slidable roof is flush with the plane of the vehicle's roof upon closing the opening. For the purpose of adjusting the position of the slidable roof in respect of the plane of the vehicle's roof, the conventional slidable roof employs a link mechanism disposed between and connecting the inside thereof and the shoes. For example, when the slidable roof closes the opening of the vehicle's roof and the level thereof is higher than that of the vehicle's roof, it is necessary to lower the slidable roof to a position wherein the outer surface thereof becomes flush with that of the stationary portion of the vehicle's roof. To conduct the lowering of the slidable roof, the connection in the link mechanism is loosened and refastened so as to obtain the desired level of the slidable roof. However, difficulties have been encountered in that workers must carry the slidable roof during such adjustment thereof and that delicate adjustment thereof is impossible.

Therefore, an object of the present invention is to provide carrier shoe means for a vehicle's slidable roof which can easily adjust the vertical level of the slidable roof and resolve the drawbacks of the conventional arrangements of the slidable roof.

According to the present invention, the above object can be accomplised by carrier shoe means for a vehicle's slidable roof which comprise shoes carying at front and rear portions a slidable roof adapted to close and open an opening of a vehicle's roof and engaging longitudinally extending rails disposed on the inside of the vehicle's roof at opposite sides of the opening, a rotatable member received in a space provided in the carrier shoe, and a link member pivotably connected at one end with the slidable roof and at the other end screwed into the rotatable member, the rotation of the rotatable member allowing the link member to move in a vertical direction thereby adjusting the position of the slidable roof relative to the vehicle's roof.

The above and other objects and features of the present invention will become apparent from the following desscriptions of a preferred embodiment with reference to the accompanying drawings, in which;

FIG. 2 is a section taken along a lime II—II in FIG. 1; and

FIG. 3 is a section taken along a lie III—III in FIG. 1.

Figure 1:
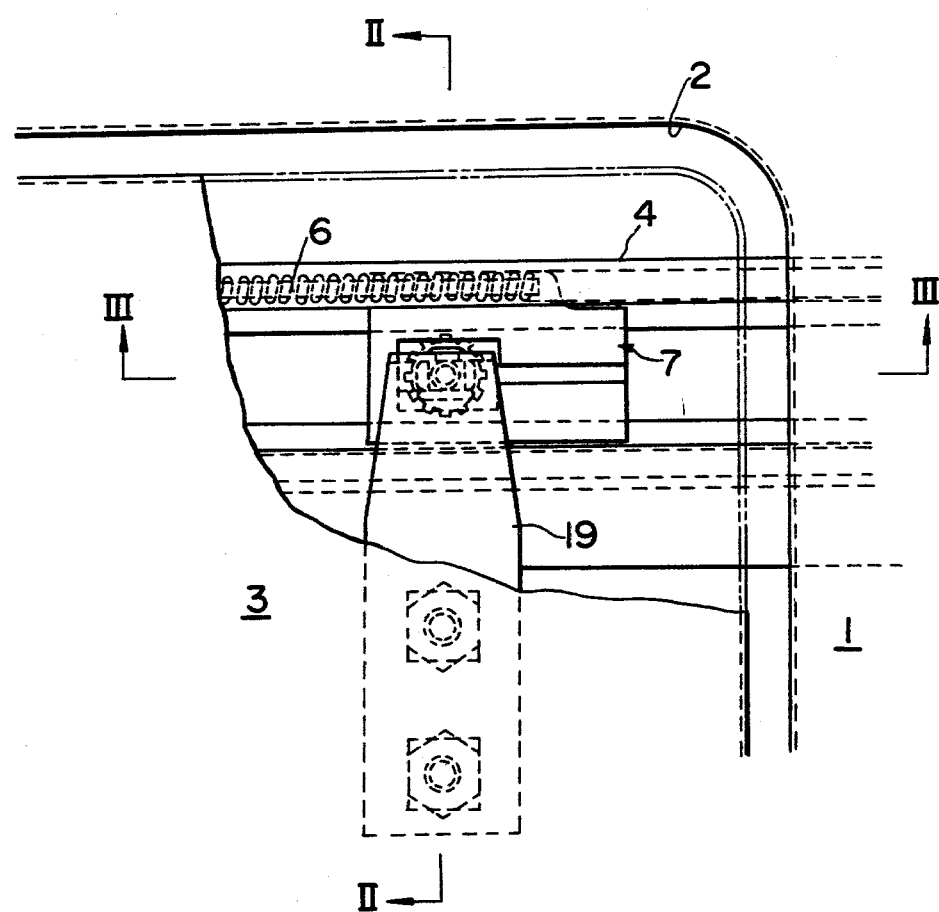
FIG. 1 is a fragmentary top plan view of roof portion of a vehicle.

Referring to FIG. 1, the roof 1 of the vehicle has a rectangular opening 2 in which a slidable roof 3 is fitted to close the same. A pair of parallel rails 4 (the other rail is not shown) are disposed on the inside of the fixed roof 1 at the opposite sides of the opening 2 and extend in a longitudinal direction. The slidable roof 3 is provided with front and rear sliding shoes 7 (only one of the rear shoes is shown in FIG. 1) which engage the rails 4 to be guided thereby. The slidable roof 3 can be lowered once and then displaced to slide backwards along the rails 4 into a space beneath the stationary portion of the roof 1 by use of a conventinal driving device (not shown) including cables 6.

Referring next to FIGS. 2 and 3, the main body 8 of the rear shoe 7 is provided with a lug 9 which can be slidably fitted into a groove 10 of the rail 4 and a wall portion 11 difining a space 12 in which a rotatable member 13 is received. In this embodiment, the space 12 is composed of a semi-spherical portion and a cylindrical portion, the rotatable member 13 being sphere shaped. The wall portion 11 is provided at the front portion with a first window 14 and at other portions with second windows 15. The rotatable member 13 has an internally threaded portion into which an externally threaded portion 16 of a link member 17 is screwed through the first window 14. The link member 17 is provided with a head 18 which is connected by a pivot to an angle member 19 secured on the inside of the slidable roof 3 by a pin 20. The rotatable member 13 is formed with its external surface having a plurality of grooves 21 and is rotated in the space 12 by, for example, a screw driver, the point of which engages the groove 21 through the second window 15.

The rotation of the rotatable member 13 acts to vary the distance (l) between the centers of the sperical member 13 and the pin 16 and to lower or lift the link member 17 so that the position of the slidable roof 3 in respect of the vehicle's roof 1 is easily adjusted to obtain the desired vertical level of the slidable roof 3. That adjustment of the position of the slidable roof can be effected when the slidabe roof 3 is merely seated in the opening 2 without being supported by workers. Thus, it is understood that the work necessary to adjust the vertical level of the slidable roof 3 is considerably simplified and becomes easy.

Alternative to the grooves 21 formed on the external surface of the rotatable member 13, a plurality of apertures which radially extend in the member 13 may be used. In this case, an elongated rod is inserted in the aperture through the second window 15 and the member 13 is rotated by the turning of the rod so that the vertical level of the slidable roof 3 can be easily regulated in the same manner as mentioned above.

When the roof is to be opened, a suitable driving device (not shown) is actuated to push the rear shoe 7 backward through the cable 6 connected thereto. The backward movement of the rear shoe 7 along the rail 4 causes the link member 17 to move along the first window 14 in a counter-clockwise direction as viewed in FIG. 3. When the rear shoe 7 is displaced to a position indicated by the broken line in FIG. 3, the link member 17 falls forward through 90° so as to drop the slidable roof 3 into a position indicated by the broken line in FIG. 3. The further actuation of the driving device (not shown) causes the slidable roof 1 to be displaced rearwardly beneath the vehicle's stationary roof 1 so as to open the opening 2.

Although the invention has thus been shown and described with reference to a specific embodiment, it should be noted that the invention is in no way limited to the details of the illustrated embodiment but changes and modifications may be made without departing from the scope of the appended claims.

I claim:

1. Carrier shoe means for a vehicle's slidable roof comprising shoes carrying a slidable roof, at front and rear portions thereof, adapted to close and oen an opening in a vehicle's roof and engaging longitudinal extending rails disposed on the inside of said vehicle's roof at opposite sides of said opening, a member rotatable about generally vertical and horizontal axes, received in a space provided in said shoe, and a link member pivotably connected about a horizontal axis at one end with said slidable roof and at the other end screwed into said rotatable member, the rotation of said rotatable member about a vertical axis allowing said link member to be screwed in a vertical direction thereby adjusting the position of said slidable roof relative to the vehicle's roof.

2. Carrier shoe means for a vehicle's slidable roof according to claim 1, wherein a pair of rear shoes are provided with said link members, respectively, and said rotatable member received in the space of said rear shoe is shaped as a sphere of which the external surface is formed with grooves or apertures.

3. Carrier shoe means for a vehicle's slidable roof according to claim 2, wherein said space of said rear shoe is defined by a wall portion extending beyond the main body of said rear shoe and said wall portion is formed with a window through which said link member extends outwardly.

* * * * *